(12) United States Patent
Gunawan et al.

(10) Patent No.: US 9,451,379 B2
(45) Date of Patent: Sep. 20, 2016

(54) SOUND FIELD ANALYSIS SYSTEM

(71) Applicant: Dolby Laboratories Licensing Corporation, San Francisco, CA (US)

(72) Inventors: David Gunawan, Sydney (AU); Dong Shi, Shanghai (CN); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 283 days.

(21) Appl. No.: 14/187,616

(22) Filed: Feb. 24, 2014

(65) Prior Publication Data
US 2014/0241528 A1 Aug. 28, 2014

Related U.S. Application Data

(60) Provisional application No. 61/776,543, filed on Mar. 11, 2013.

(30) Foreign Application Priority Data

Feb. 28, 2013 (CN) .......................... 2013 1 0064537

(51) Int. Cl.
| | |
|---|---|
| H04S 1/00 | (2006.01) |
| H04R 3/00 | (2006.01) |
| H04R 5/027 | (2006.01) |
| H04S 3/00 | (2006.01) |
| H04S 7/00 | (2006.01) |
| G01S 3/802 | (2006.01) |
| G10L 19/008 | (2013.01) |

(52) U.S. Cl.
CPC ................ H04S 7/30 (2013.01); G01S 3/802 (2013.01); G10L 19/008 (2013.01); H04S 2400/15 (2013.01)

(58) Field of Classification Search
None
See application file for complete search history.

(56) References Cited

U.S. PATENT DOCUMENTS

| | | |
|---|---|---|
| 5,390,256 A | 2/1995 | Mandell |
| 6,021,386 A | 2/2000 | Todd |

(Continued)

FOREIGN PATENT DOCUMENTS

| | | |
|---|---|---|
| EP | 1083769 | 6/2010 |
| WO | 2011/104418 | 9/2011 |

(Continued)

OTHER PUBLICATIONS

Daniel, A., "Spatial Auditory Blurring and Applications to Multichannel Audio Coding," Orange Labs—Lannion, CIRMMT—Schulic School of Music, Sep. 14, 2011.

(Continued)

*Primary Examiner* — Jesse Elbin
*Assistant Examiner* — Kenny Truong

(57) ABSTRACT

In one embodiment, a sound field is mapped by extracting spatial angle information, diffusivity information, and optionally, sound level information. The extracted information is mapped for representation in the form of a Riemann sphere, wherein spatial angle varies longitudinally, diffusivity varies latitudinally, and level varies radially along the sphere. A more generalized mapping employs mapping the spatial angle and diffusivity information onto a representative region exhibiting variations in direction of arrival that correspond to the extracted spatial information and variations in distance that correspond to the extracted diffusivity information.

26 Claims, 5 Drawing Sheets

(56) References Cited

U.S. PATENT DOCUMENTS

| | | | |
|---|---|---|---|
| 6,766,028 B1* | 7/2004 | Dickens | H04S 3/004 381/17 |
| 7,809,453 B2 | 10/2010 | Reichelt | |
| 8,180,062 B2 | 5/2012 | Turku | |
| 8,184,814 B2 | 5/2012 | Cvetkovic | |
| 8,229,134 B2 | 7/2012 | Duraiswami | |
| 2001/0014854 A1 | 8/2001 | Stegmann | |
| 2001/0033583 A1 | 10/2001 | Rabenko | |
| 2002/0076034 A1 | 6/2002 | Prabhu | |
| 2002/0116196 A1 | 8/2002 | Tran | |
| 2005/0069203 A1 | 3/2005 | Khomo | |
| 2005/0182620 A1 | 8/2005 | Kabi | |
| 2009/0116652 A1 | 5/2009 | Kirkeby | |
| 2009/0147961 A1 | 6/2009 | Lee | |
| 2009/0222272 A1 | 9/2009 | Seefeldt | |
| 2009/0252356 A1 | 10/2009 | Goodwin | |
| 2010/0070276 A1 | 3/2010 | Wasserblat | |
| 2011/0004473 A1 | 1/2011 | Laperdon | |
| 2012/0116766 A1 | 5/2012 | Wasserblat | |

FOREIGN PATENT DOCUMENTS

| | | |
|---|---|---|
| WO | 2012/072798 | 6/2012 |
| WO | 2012/072804 | 6/2012 |
| WO | 2012/125855 | 9/2012 |

OTHER PUBLICATIONS

Valle, A. et al, "Simulating the Soundscape through an Analysis/Resynthesis Methodology," CIRMA, Universita di Torino, Music Technology Group, May 18-22, 2009.

Bregman, A., "Auditory Scene Analysis: Hearing in Complex Environments," Thinking in Soun: The Cognitive Psychology of Human Audition, 1993.

Beritelli, F. et al, "Performance Evaluation and Comparison of G.729/AMR/Fuzzy Voice Activity Detectors," Signal Processing Letters, IEEE, vol. 9, Issue 3, pp. 85-88, Mar. 2002.

Davis, A., "A Study of Voice Activity Detectors," Electrical and Computer Engineering, 2008.

Freund, Y. et al, "A Decision—Theoretic Generalization of the On-Line Learning and an Application to Boosting," Proceedings of the Second European Conference on Computational Learning Theory, Mar. 13-15, 1995.

Gilg, V. et al, "Methodology for the Design of a Robust Voice Activity Detector for Speech Enhancement," International Workshop on Acoustic Echo and Noise Control, Sep. 2003.

Kularatna, N. et al, "Essentials of Modern Telecommunications Systems," Arctec House, May 2004.

Ramirez, J. et al, "Voice Activity Detection. Fundamentals and Speech Recognition System Robustness," Robust Speech Recognition and Understanding, Jun. 2007.

Ravichandran, T. et al, "Performance Evaluation and Comparison of Voice Activity Detection Algorithms," International Journal of Soft Computing, vol. 2, Issue 2, pp. 257-261, 2007.

Scholkopf, B. et al, "Learning with Kernels, Support Vector Machines, Regularization, Optimization, and Beyond," MIT Press, Dec. 15, 2001.

Dickins, G. et al, "On Spatial Localization of a Wireless Transmitter from a Multisensor Receiver," 2nd International Conference on Signal Processing and Communications Systems, pp. 1-8, Dec. 15-18, 2008.

Stoica, P. et al, "Maximum Likelihood Methods for Direction-of-Arrival Estimation," IEEE Transactions on Acoustics, Speech and Signal Processing, vol. 38, Issue 7, Jul. 1990.

Paulraj, A et al, "Estimation of Signal Parameters Via Rotational Invariance Techniques—Esprit," Nineteenth Asilomar Conference on Circuits, Systems and Computers, Nov. 6-8, 1985.

Schmidt, R.O. "Multiple Emitter Location and Signal Parameter Estimation" IEEE Transactions on Antennas and Propagation; IEEE Service Center, Piscataway, NJ, USA vol. AP-34, No. 3, Mar. 1, 1986, pp. 276-280.

* cited by examiner

SOUND FIELD ANALYSIS SYSTEM

CROSS-REFERENCE TO RELATED APPLICATIONS

This application claims benefit of priority to related, co-pending Chinese Patent application number 201310064537.X filed on Feb. 28, 2013 and U.S. provisional application No. 61/776,543, filed on Mar. 11, 2013, which is incorporated herein by reference in its entirety.

TECHNICAL FIELD

The present disclosure relates generally to audio scenes, and more particularly, to feature extraction from an audio scene.

BACKGROUND

An audio scene comprises a multi-dimensional environment in which different sounds occur at various times and positions. An example of an audio scene may be a conference room, a studio, performance hall, gaming environment, restaurant, a forest scene, a busy street or any indoor or outdoor environment where sound occurs at different positions and times.

Audio scenes can be recorded as audio data, using arrays of direction or omni-directional microphones or other like means. In a typical capture arrangement for an audio scene, N recording devices are positioned within an audio space to record the audio scene. The captured signals are then optionally processed and transmitted (or alternatively stored for later consumption) to the rendering side where the end user or application can select from various rendering algorithms that may affect the listening point and/or the orientation and characteristics of the audio information based on preference from the reconstructed audio space. The rendering part then provides a processed signal from the multiple recordings that correspond to the desired and selected perceptual presentation of the source soundfield. The recording devices can be microphones that have a directional characteristic of audio sensitivity, but other types of microphones having any form of suitable characteristics can be employed. Furthermore, the multiple microphones employed may not necessarily be equivalent or even similar and microphones with different spatial and/or frequency characteristics may be used. The rendered or processed output signal may be a mono, stereo, or binaural signal or it may consist of multiple channels.

OVERVIEW

As described herein, a method for creating a spatial audio scene analysis of a sound field includes generating electrical signals in response to the sound, extracting spatial angle information from the electrical signals, extracting diffusivity information from the electrical signals, and mapping the spatial angle and diffusivity information for representation in the form of a closed two dimensional surface, or a higher dimensional extrusion of the same, wherein this two dimensional surface has a isopmorphism to a hemisphere such that variation in the object spatial angle represents variation longitudinally and variation of the source diffusivity and thus associated distance varies latitudinally along the hemisphere, or equivalently on the surface such that more diffuse or distant sources converge to a point in this closed two dimensional surface.

Also as described herein, a system for mapping a sound field based on electrical signals received in response to sound in the sound field includes a spatial angle extraction module operable to extract spatial angle information, a diffusivity extraction module operable to extract diffusivity information, and a mapping module operable to represent the spatial angle and diffusivity information in the form of a closed two dimensional surface, or a higher dimensional extrusion of the same, wherein this two dimensional surface has a isopmorphism to a hemisphere such that variation in the object spatial angle represents variation longitudinally and variation of the source diffusivity and thus associated distance varies latitudinally along the hemisphere, or equivalently on the surface such that more diffuse or distant sources converge to a point in this closed two dimensional surface.

Also as described herein, a system includes an array of microphones operable to generate electrical signals from a sound field and a processor responsive to the electrical signals. The processor is operable to extract spatial angle information from the electrical signals, extract diffusivity information from the electrical signals, and map the spatial angle and diffusivity information for representation in the form of a closed two dimensional surface, or a higher dimensional extrusion of the same, wherein this two dimensional surface has a isopmorphism to a hemisphere such that variation in the object spatial angle represents variation longitudinally and variation of the source diffusivity and thus associated distance varies latitudinally along the hemisphere, or equivalently on the surface such that more diffuse or distant sources converge to a point in this closed two dimensional surface.

The embodiments described herein generally relate to a mapping of feature space which creates an improved ability to analyze and interpret an auditory scene. Some advantages that may be realized include:

In contrast to a natural physical spatial map where objects can be potentially an infinite distance away, the disclosure herein maps the object space into a closed surface. This has the advantage of being compact and permitting a known bound on the number of discrete resolvable objects.

The mapping and associated space for objects and observations is relatively consistent in the sense that a simple distance metric equates to regions and distances of similar expected practical uncertainty and differentiation. This avoids the need for specific learning of the anticipated object sizes in different spatial regions.

The mappings avoid any point of singularity, where one dimension becomes uncertain as another converges. In particular, the relationship generally observed in reverberant indoor environments is that the direction of a source becomes more uncertain as the source becomes more distant (or diffuse). This relationship of diffuse and distance, along with angular uncertainty, is captured in the presented mappings by having this normal singularity point associated with the region of the 'North Pole' or apex of a hemisphere. This topology naturally supports the uncertainty in angle with diffuse or distance objects.

Related to the previous point, the mapping avoids regions where there would be expected large discontinuity in observations arising from expected physical or practical uncertainties in the initial extracted features. In particular, the notion of large positional variation as the angle becomes uncertain at large distances is avoided by reflecting this topology into one where large angular variations for distant source represent only small variation in position in the mapped feature space.

The mapping permits that when there are conflicts of observation (ie with simultaneous sources it is only possible to resolve the direction of a finite number— usually N−1 given N channels) the observations during such times of uncertainty are pushed or clustered away from the areas associated with the individual object observations.

Whilst the mappings presented are detailed and non-trivial, and rely on knowledge of both the nature of the initial features and useful properties of a space used for clustering and analysis, it should be evident to those skilled in the art that the above set of properties are very useful in any subsequent analysis.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
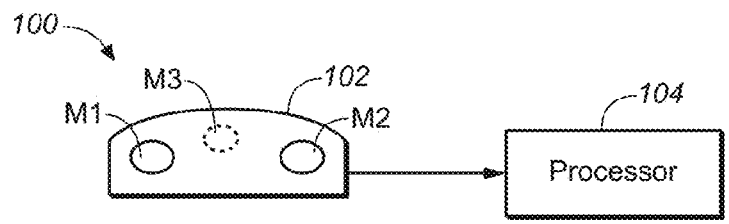
FIG. 1 is a schematic diagram of a sound field capture system.

Example embodiments are described herein in the context of a system of computers, servers, and software and process for performing feature extract for audio scene analysis from a compact directional array. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The term "exemplary" when used herein is intended to mean "serving as an example, instance or illustration." Any embodiment described herein as "exemplary" is not necessarily to be construed as preferred or advantageous over other embodiments.

In addition to capturing the audio signal itself for certain purposes or applications, a processing system may at the point of capture, or further downstream, perform a detailed analysis of the incoming audio signals that represent the soundfield. The arrangements herein relate to a particular form of analysis, wherein the scene is known to represent auditory emitting objects and an acoustic environment. In particular, one concern with the disclosure herein is with the sort of auditory scene that would normally be encountered in the general experience of a normal subject throughout activities of work and or leisure for example. Such an auditory scene is known to have certain properties and characteristics, one of which is that the scene will generally contain distinct or distinctly perceived sound objects. With reference to Bregman (Bregman, A. S. (1993). Auditory Scene Analysis: Hearing in Complex Environments. *Thinking in Sound: The Cognitive Psychology of Human Audition*. S. McAdams and E. Bigand. Oxford: 10-36.), the process of seeking to analyze and understand an auditory scene in a manner similar to human perception is undertaken.

This area is known to those skilled in the art as Computational Auditory Scene Analysis (CASA). The scene analysis is generally performed to aid in the application and control of suitable signal processing to the captured signals and/or to extract data that can be of advantage downstream in the rendering or utilization of the captured audio in some further application area. The scene analysis may additionally be used for other informational purposes such as, for example, display or forensic style logging. It is generally true that computational auditory scene analysis is designed to take advantage of perceptual aspects of source identification and grouping, as this provides a useful set of criteria, assumptions and a priori information that can be used to improve the stability and subjective performance of the extracted auditory scene.

Since an auditory scene involves a representation of discrete sources, acoustic objects and/or general background noise and acoustic interference, it is advantageous, if not strictly necessary, to have some internal representation of 'feature space' into which the observations and estimations from the microphone or multichannel signal at different points in time can be placed and appropriately grouped. Disclosed herein is an approach for forming this internal multidimensional representation that underlies the identification and separation of auditory objects in the auditory scene. In particular, for robust and practical algorithms, it is often desirable to have a space that reflects a certain topology or natural associated distance metric that relates to the underlying problem and expected practical uncertainties. In particular, the disclosure herein relates to a class of mappings from a conventional feature space into a modified multi-dimensional feature representation which is found to be highly advantageous for the process of computational auditory scene analysis. This space is both useful for visualization, statistical analysis, observation clustering and object identification. The disclosure herein relates to two particular inventive aspects of the particular selection of features, both in nature and specific design, and also the particular mappings from the simple feature space to a representation that has been found to be very effective in this application area.

FIG. 1 is a schematic diagram of a sound field capture system 100 in accordance with certain embodiments described herein. Sound field capture system 100 includes a microphone array 102 coupled to a processing device 104. The microphone array 102 comprises two or more microphones. In the arrangement of FIG. 1, three cardioid microphones, M1, M2, and M3 are used. The microphones are arranged 120 degrees apart in a circular configuration approximately 5 cm in diameter. Such an exemplary arrangement enables a first order estimation of a planar sound field (without a z component). The microphones M1, M2, and M3 capture audio signals loosely labeled Left, Right and Surround from the audio scene, with the respective signals designated L,R,S.

Figure 2:
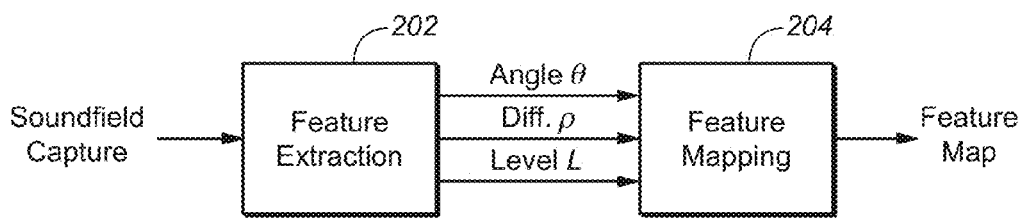
FIG. 2 is a block diagram showing the process flow for a feature extraction and mapping process.

FIG. 2 is a block diagram showing the process flow for a feature extraction and mapping procedure performed by processing device 104. Sound field capture effected by microphone array 102 (FIG. 1) is provided to a feature extraction module 202. A feature mapping module 204 receives the output of the feature extraction module, and generates a feature map. In certain embodiments, the generated feature map is a closed space with a simple metric having a relatively consistent variance due to practical uncertainties, avoiding singularities and discontinuities due to expected physical or practical measurement uncertainties, and supporting differentiation between real object observations and spurious observations caused by colliding audio stimulus. The procedure performed by processing device 104 includes a mapping process in which extracted angle, diffusivity, and optionally, level information relating to one or more objects in the audio scene is mapped for representation into a topology that is representative of a closed disc or hemispherical convex hull for the features representing direction and diffusivity, and additional dimensions for further features, in particular the power or signal level of the audio activity. One approach for such a mapping detailed herein is a derivative of the Riemann sphere mapping. In this case, the signal level additionally modifies the observation mapped radius from the origin, as detailed below.

In an exemplary embodiment, the sound field capture is a function of input signals provided by microphones M1, M2, and M3 of the microphone array 102 to feature extraction module 202. From these input signals, designated L, R and S, feature extraction module 202 operates to extract instantaneous spatial features of the sound field. These features, which include source angle ($\theta$), source diffusivity ($\rho$), and optionally, source level (L), are mapped by mapping module 204 onto a feature space which serves to maximize the uniformity of the variance of spatially stationary audio objects from the sound field capture. Mapping in this sense is intended to mean a form of representation, and does not necessarily entail a visual presentation, although in certain embodiments a visual presentation is contemplated.

In certain embodiments, the sound field is analyzed on a frame-by-frame basis (typically about 20 ms). For source angle ($\theta$), an angular estimate is computed for each frame. The angular estimate corresponds to an instantaneous or appropriately estimated angle of an active object in the sound field. In certain embodiments, this is the loudest object in the sound field. In other embodiments, it is a particular object that is being tracked. The extracted features and associated sound-emitting object corresponds to a selected region related to an object in the audio scene that is presently being tracked or estimated to be active. In further embodiments, it may also contain angular information regarding the directional bias of stationary and/or diffuse background noise, such as is expected in many audio capture applications.

The diffusivity ($\rho$) of an object represents the degree of how diffuse the sound field gets when the sound is emitted, for example when a human speaks. Diffusivity is an indicator of the reverberation of the room or environment, and the distance the object source is from the microphone array. The diffusivity or similar feature can be defined and derived in many different ways. Such examples include:

- assessing the eigenvalues of a short term estimation of the input signal covariance matrix, where the ratio of the first to subsequent eigenvalues is in indicator of the strength of the direct sound,
- utilizing the gradient of the power or signal amplitude in a given frequency band or bands, where a faster attack or decay is indicative of less diffuse or reverberant incident audio.
- utilizing the spectral characteristics of a known or reasonably modeled source, where an attenuation of higher frequencies is related to the distance travelled by the direct and subsequent sound from the source,
- utilizing the level or aspects of estimated level for any source that can be known or well modeled,
- utilization of various ratios between cross correlation and autocorrelation terms, such as that obtained from a simple measure of correlation between input channels, with reverberant or distant sounds generally having less correlation at any compact microphone array,
- utilizing the difference in amplitude between microphones as an indicator of distance, for example as presented in (Dickins, Kennedy, "On the spatial localization of a wireless transmitter from a multisensor receiver", Signal Processing and Communication Systems, 2008. ICSPCS 2008).

Other means may be known or generally envisaged with the association that an impression of the distance of a source from the microphone array in the associated real acoustic and physical space can be associated with a monotonic relationship to this selected and subsequently mapped feature.

Level (L), which is an optional feature that can be extracted, corresponds to the power of the current frame. It may represent the power at a particular angle, such as would be obtained from a steered or calculated beam in a particular direction, or the total power of the entire sound field co-incident on the microphone array.

Figure 2A:
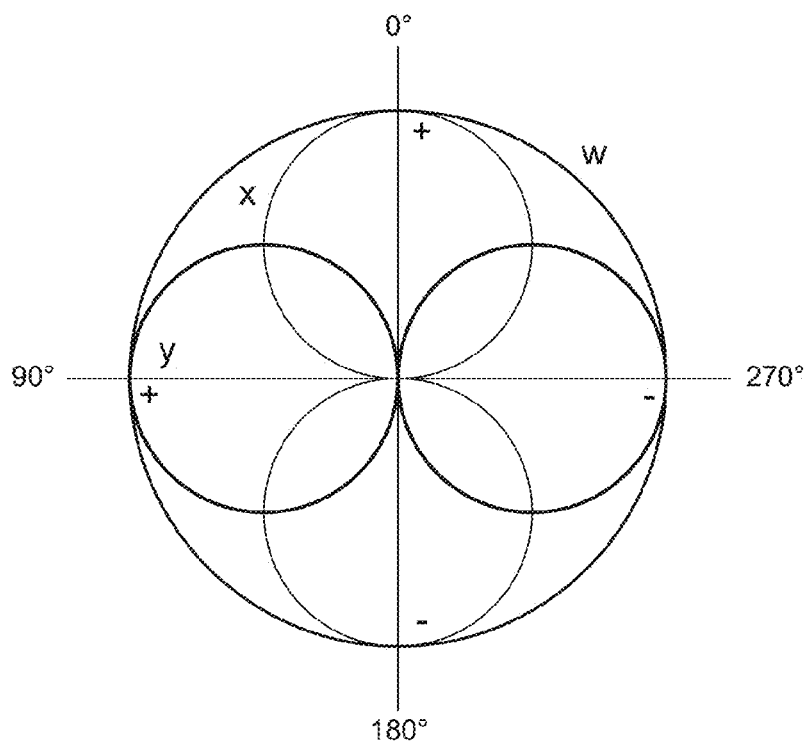
FIG. 2A is a schematic diagram showing the figure eight patterns of the X-Y signals in the horizontal plane, and the omnidirectional W channel as used in one exemplary embodiment.

Returning to FIG. 2, feature extraction module 202 receives the LRS input signals from microphones M1, M2, and M3 of the microphone array 102. In certain embodiments, the received signals, which may number more than three, are converted to first order sound field "WXY" format using a simple linear transformation matrix or equivalent mixing and extraction operation, where W denotes an omni-directional ($0^{th}$ order) and X and Y denote figure of eight or first order signals perpendicular to each other in the horizontal plane, as seen in FIG. 2A. It should be apparent to those skilled in the art that many possibilities for the input signal count, microphone geometry and intermediate processing format are possible as suitable for the feature extraction process. The exemplary embodiment presented here based on LRS and WXY is convenient in both its simplicity for presentation, and practical value in the field of application. The first order sound field signals WXY are applied as inputs into a feature extraction process that is used to perform spatial angle estimation, and optional speech level estimation, and optional diffusivity estimation, as follows:

Spatial Angle Estimation

Generally, extracting the spatial angle includes generating one or more covariance matrices between incoming signals or transformations of incoming signals over subsets of signal or frequency ranges, and analyzing the generated covariance matrices to extract associated directional information of one or more sources.

Let $W(\omega, n)$, $X(\omega, n)$ and $Y(\omega, n)$ represent the frequency domain of the WXY microphone signals, respectively while $\omega$ is the normalized angular frequency in which $\omega = 2\pi f/f_s$, where $f_s$ is the sampling frequency and n is the frame index. The channels are first transformed into LRS format as:

$$\begin{bmatrix} L(\omega, n) \\ R(\omega, n) \\ S(\omega, n) \end{bmatrix} = \begin{bmatrix} \frac{1}{2} & \frac{1}{4} & \frac{\sqrt{3}}{4} \\ \frac{1}{2} & \frac{1}{4} & -\frac{\sqrt{3}}{4} \\ \frac{1}{2} & -\frac{1}{2} & 0 \end{bmatrix} \begin{bmatrix} W(\omega, n) \\ X(\omega, n) \\ Y(\omega, n) \end{bmatrix} \quad (1)$$

Denote $X(\omega, n) = [L(\omega, n) \; R(\omega, n) \; S(\omega, n)]^T$, the channel covariance for frequency $\omega$ is calculated as:

$$cov(\omega, n) = \alpha cov(\omega, n-1) + (1-\alpha) X(\omega, n) X^H(\omega, n) \quad (2)$$

where $\alpha$ is a smoothing factor (set as 0.9 and in some embodiments suitably time varying based upon a classification or inference of present signal activity) and $[x]^H$ represents conjugate transpose of vector x. Generally, smoothing should be reduced when there is more immediate voice or active sources. The nature of this covariance averaging is already primed to shift faster to high power signal at their onset.

The sum of all covariance matrices of interest is computed as:

$$cov_s(n) = \Sigma_{\omega_i = \omega_L}^{\omega_U} cov(\omega_i, n) w(\omega_i, n) \quad (3)$$

where $\omega_L$, and $c\omega_U$ are the lower bound and upper bound of frequency of interest. Here, the lower bound and upper bound are set as 200 Hz and 8000 Hz, respectively due to the fact that most speech components lie within this range. In addition, excluding the rest of the bins would provide less computational complexity and estimation noise. $w(\omega_i, n)$ is the corresponding weight that allows us to further adjust the importance of each bin.

An eigen-decomposition is performed on $cov_s(n)$:

$$[V, D] = eigen(cov_s(n)) \quad (4)$$

where V is a 3 by 3 matrix with each column representing an eigenvector of $cov_s(n)$ and D is a diagonal matrix with the corresponding eigenvalues sorted in descending order. Let $v_1$ be the first column of V which corresponds to the largest eigenvalue. Also, let P be a M by 3 matrix with k-th row defined as:

$$P_k = \left[ 0.5 + 0.5\cos\left(\frac{2\pi k}{M} - \frac{\pi}{3}\right) 0.5 + \right. \quad (5)$$
$$\left. 0.5\cos\left(\frac{2\pi k}{M} + \frac{\pi}{3}\right) 0.5 + 0.5\cos\left(\frac{2\pi k}{M} - \pi\right) \right]$$

is a 3 by 1 row vector. (5) is derived based on the directionality of the proposed microphone array which has a given amplitude response for a specific source at angle $$\frac{2\pi k}{M}$$

(in radius). The predefined value M defines the angle resolution, i.e., how the number of discrete point the whole plane is divided into. Therefore, P stores the ideal amplitude "patterns" for all the defined angles. P is therefore a 360 by 3 matrix.

By using (4) and (5), the angle of the source can be estimated as the index of the row in P whose dot product with $v_1$ is the largest:

$$\theta(n) = \arg\max(Pv_1) \quad (6)$$

In (6), $Pv_1$ is an M by 1 vector with each entry representing the dot product of $v_1$ with a predefined amplitude pattern from a given angle. The index of the largest value in this vector corresponds to the angle of the source.

There are other techniques for determining instantaneous or otherwise estimated direction of arrival for microphone arrays as suggested in this exemplary embodiment and for a much greater class of directional and non-directional microphone arrays. Some particular examples are known as Maximum Likelihood, MUSIC (Stoica, P "Maximum likelihood methods for direction-of-arrival estimation" IEEE Tran Acoustics, Speech and Signal Processing, Volume: 38 Issue: 7 Page(s): 1132-1143), and ESPRIT (Paulraj, A. "Estimation Of Signal Parameters Via Rotational Invariance Techniques-Esprit" Nineteeth Asilomar Conference on Circuits, Systems and Computers, 1985.).

Speech Level Estimation

The speech level at frame index n is simply obtained as:

$$L(n) = P_V(n) 10 \log 10(\Sigma_{\omega_i = \omega_L}^{\omega_U} |W(\omega_i, n)|^2) \quad (7)$$

where $W(\omega_i, n)$ is the frequency domain version of W channel mentioned above and $P_V(n)$ is the probability of having voice for frame n (can be obtained by using a voice activity detector) and is a binary number (0/1). The speech level is only accounted where there is voice. In addition to an aggregate of frequency bins, this level estimate may be filtered over time using an averaging or simple first order filter such as suggested earlier in relation to the covariance matrix computation. Such filtering is generally low latency and causal to permit real time operation; however, it may not be restricted to such. Additionally, in other embodiments, the level may be accumulated not only for speech activity, thus allowing non speech objects, including the background noises, to be identified suitable in level and added to any map and associated scene analysis.

Diffusivity Estimation

Figure 3:
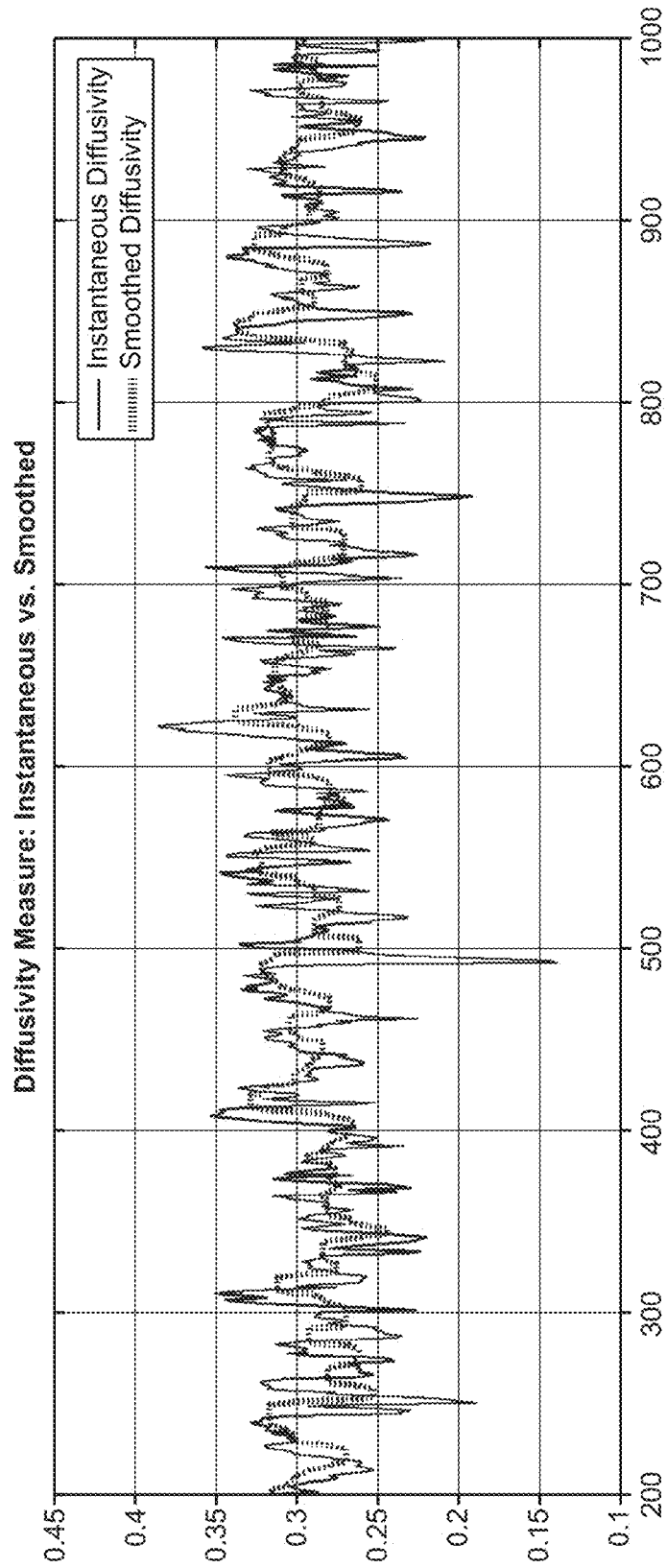
FIG. 3 is a graph of instantaneous vs. smoothed diffusivity.

The diffusivity measure is an indication of how reverberant the acoustic signal arriving at the microphone location from a particular source is. By using the eigenvalues obtained in (4), the instantaneous diffusivity $\rho_{inst}(n)$, is defined as the ratio of the second largest eigenvalue over the largest one:

$$\rho_{inst}(n) \triangleq \frac{d_2}{d_1} \quad (8)$$

where $d_1$ and $d_2$ are the first and second diagonal component in D, respectively. The reason for doing so is based on the assumption that the largest eigenvalue corresponds to the direct source energy while the second largest corresponds to reflections and reverberation. Therefore, for less reverberant rooms this ratio would be much lower than more reverberant ones. Since the instantaneous diffusivity $\rho_{inst}(n)$ is noisy can contains a lot spikes, a median filter is further employed to provide a smoother output:

$$\rho(n)=\text{med}([\rho_{inst}(n)\rho_{inst}(n-1), \ldots \rho_{inst}(n-Q-1)]^T) \quad (9)$$

Where med(x) represents finding the median value of vector x. In (9), the median value of diffusivity is sought based on the current instantaneous value and past Q−1 instantaneous values stored, where Q is a predefined memory length. FIG. 3 shows the comparison between the instantaneous diffusivity and the median filtered version.

It can be seen from FIG. 3 that the instantaneous diffusivity has numerous spikes and hence much larger variance, whereas the median filtered version quickly tracks the floor of the instantaneous diffusivity and has much smaller variance in comparison. Hence by using (9), the robustness and stability of the diffusivity is enhanced.

The spatial angle estimation, speech level estimation and diffusivity estimation determined by the feature extraction module 202 are provided to the feature mapping module 204. At each time frame, the feature mapping module maps the extracted features corresponding to direction of arrival and diffusivity onto a hemisphere or more general convex hull having the closed topology similar to that of a disc. In the case of a three dimensional representation where there is an additional dimension along the radius from a central origin, the mapping is shown to be equivalent or related to that of a Riemann sphere representation. This transformation is known to map the complex plane, or an infinite extent two dimensional plane, into a closed sphere, or the complex plane beyond a certain radius onto a hemisphere.

Figure 4:
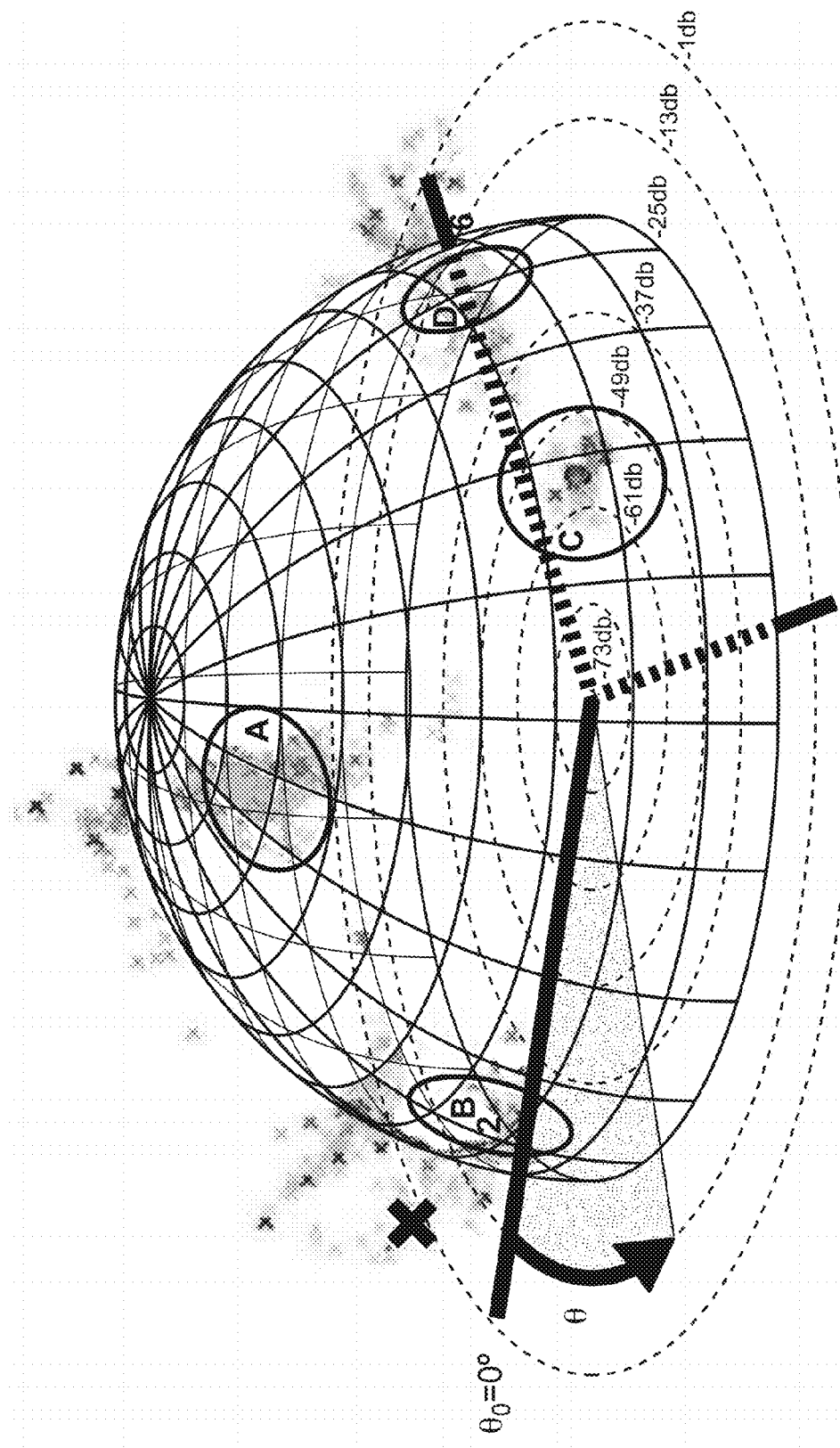
FIGS. 4-6 are diagrams showing Riemann sphere mappings of the extracted source angle (θ), source diffusivity (ρ), and source level (L) features of sound field objects in accordance with certain embodiments.
Figure 5:
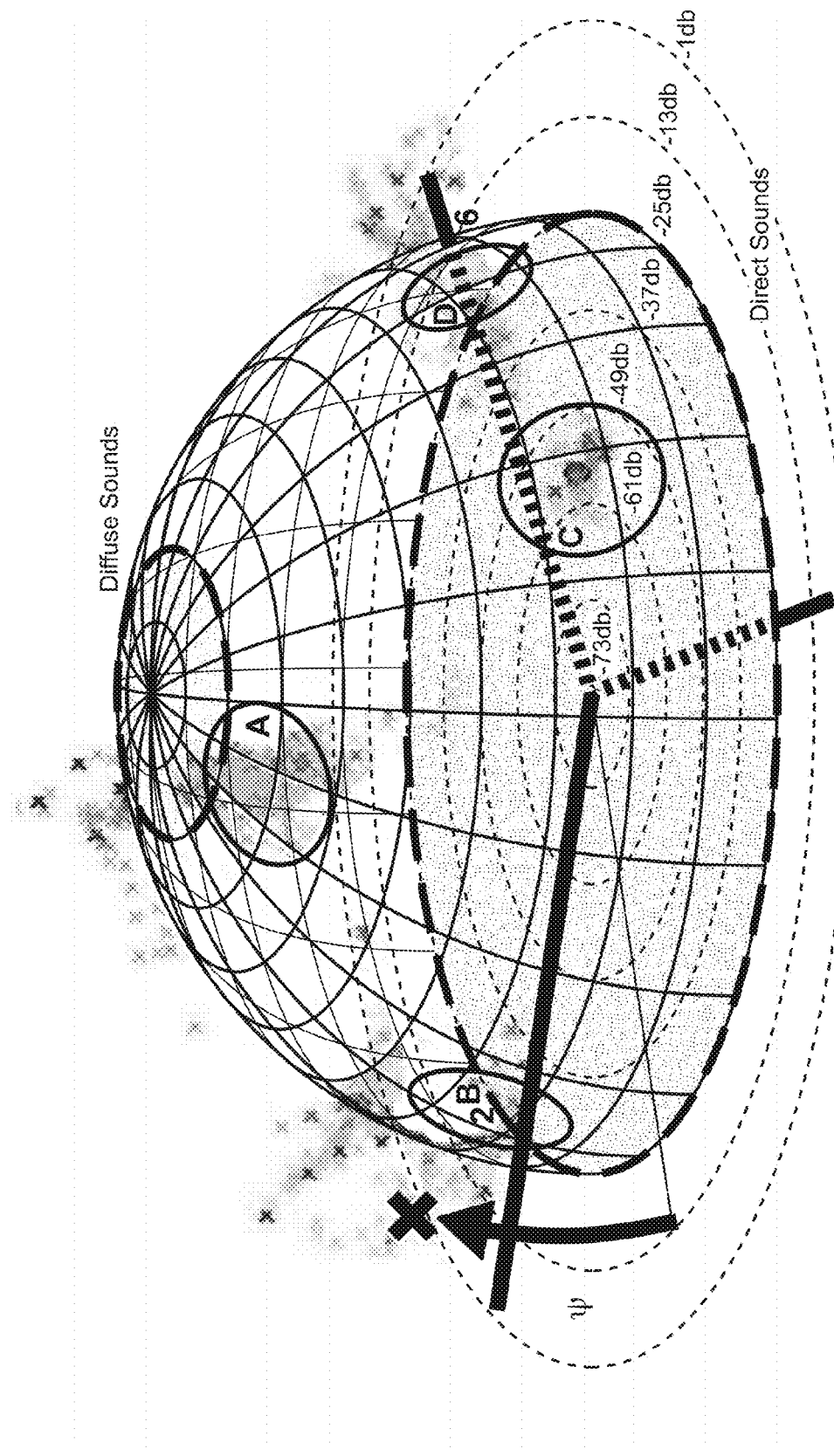
Figure 6:
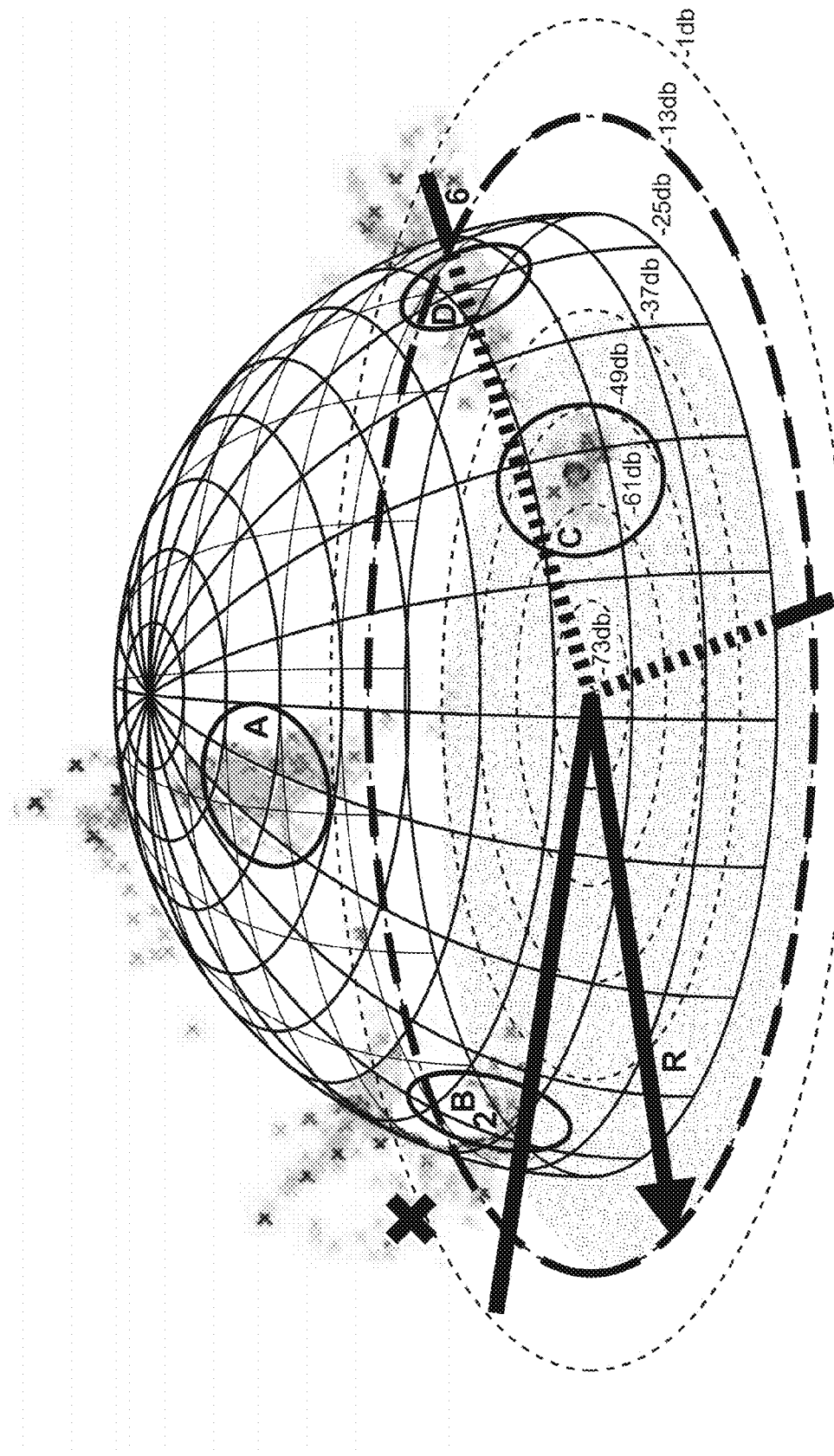

FIGS. 4-6 are diagrams showing Riemann sphere mappings of the extracted source angle (θ), source diffusivity (ρ), and source level (L) features of sound field objects in accordance with certain embodiments. In certain embodiments, the feature scaling and subsequent mapping is designed and implemented to achieve a relatively uniform mapping, in terms of the shape and size, of the variance in any observation due to practical measurement and environmental uncertainty. Since not all sound sources are a point, the complexities of the acoustic environment, interference and general uncertainty in processing and estimation, any short term observation will have some natural variance for real acoustic objects in the scene. The nature of the mapping presented here, as can be seen in the figures, is that the uncertainty of variance of observations around the clustering region for a given object in the mapped feature space is relatively constant. In certain embodiments, diffuse sounds are mapped to the top of the sphere. Such observations will naturally have increasing uncertain regarding the true direction of arrival, and by mapping to the top of the sphere, the dimension of direction of arrival corresponds to reducing a variation in the position of a point within the mapped feature space. Thus the increasing uncertainty of the source location, due to fundamental limits of the practical system and acoustic environment, does not cause a distracting variation in the location of observations in the mapped feature space. In certain embodiments, direct sounds, which are associated with a closer source and generally more accurate direction of arrival, map to the equatorial plane and thereby have inherent spatial acuity in the mapped feature space. Small angular uncertainty for close sources is viewed on a similar scale in the mapped feature space to larger angular uncertainty for more distant or diffuse objects. In this manner, the observation points associated with given objects can be the same size (have uniform variance), so that a distance metric and thresholds to be utilized for clustering and distinct resolution of objects can be fixed across the mapped feature space. The mapping provides a compact representation of the extracted sound field objects. As objects are further away, they map to the north pole of the hemisphere. Furthermore, when level is optionally included as a radial component, softer sounds are grouped closer together, whilst louder sounds are placed further apart. This is intuitively and practically appealing again, since the lower level sounds will have lower signal to noise ratio against environmental and practical detection noise. As a result of this reduction in signal to noise ratio, lower level sources will generally have greater uncertainty in both direction of arrival and the diffusivity or distance metric. By having low level sources cluster towards the origin, again it is seen that certain classes of objects can be conveniently grouped in this mapped feature space. In particular, a low level background noise will be clustered towards the origin. In some embodiments, the radial scale relating to the level is adjusted based on a linear, logarithmic or power relationship to the instantaneous signal level estimate. In other embodiments, the power level may be scaled or mapped to a given range where the origin represents some lower power bound or estimated noise floor, and the shell or unit hemisphere represents a nominal or average speech volume associated with the signal incident from a source having a distance or physical position that would be associated with the position on the mapped feature space. In this manner, the level dimension typically mapped to a radial variation, is used to cluster background sound or audio objects at a background noise level at the origin leading to a single cluster for any background noise object that may be represented in the final object based scene analysis.

In FIGS. 4-6, the mapping is for spatial angle, diffusivity and level for four objects designated by circles A, B, C, and D. The x's denote individual frame values clustered at the object locations in the hemisphere, leading to the circle designations of the four objects. From FIG. 4, it can be seen that spatial angle is mapped along the equatorial axis, and varies longitudinally along the equatorial axis, with the forward direction being directed at 0 degrees. Angle designations are demarcated by "θ".

FIG. 5 shows a mapping for the diffusivity, which is mapped along the polar axis (latitude) demarcated "ψ", varying latitudinally with diffusivity. In FIG. 5, less reverberant sounds correspond to observations near the equator, while more reverberant—that is, diffuse—sounds are mapped closer to the north pole.

FIG. 6 shows a mapping for level, along the radial axis R. In this mapping, loud sounds are mapped further from the origin (larger radius), while soft sounds are mapped closer to the origin (smaller radius). It should be noted that sound level mapping in this example exhibits a monotonic variation in radius in the mapped feature space. Monotonic variation is intended to include all of linear, power, dB, limited range, scaled for average level being at unity.

For each observation of angle (θ) and diffusivity (ρ) and level (L) at frame f, we can map the angle θ and diffusivity ρ to an X-Y plane, where ρ (radial component) and θ (angular component) are mapped using polar coordinates.

$$x=\rho' \cos(\theta)$$

$$y=\rho' \sin(\theta)$$

Where $\rho'=\max(\rho_{min}, \min(\rho_{max}, \rho))$, such that $\rho_{min}$ and $\rho_{max}$ are the smallest and largest values allowable for diffusivity.

From a 2D plane map, each data point is then mapped to the Riemann sphere (Xr, Yr, Zr):

$$Xr=2x/(1+x^2+y^2)$$

$$Yr=2y/(1+x^2+y^2)$$

$$Zr=(x^2+y^2-1)/(1+x^2+y^2)$$

This maps the points containing the ρ and θ information to the Riemann sphere. The optional level information can be used by accounting for L in the radial component.

Objects are then classified into clusters based on a distance measure that is relatively constant within this feature space related to the mapping. That is, in the mapped feature space, the Euclidian distance between two observations is roughly related to the likelihood that both observations relate to the same underlying audio object, regardless of the absolute position of those two observations in the mapped space. In this way, the mapping is able to utilize the characteristic features of direction of arrival, diffusivity or distance and source level to cluster and identify separate audio objects in a meaningful and computationally effective way. Since the mapping is guided and designed against the practical problem framework, it is relatively consistent between applications and different environments for the same device. Hence the problem of clustering for subsequent scene analysis becomes a problem in a closed subspace with a constant distance norm and simple topology, rather than being a more complicated manifold that then requires more complex algebra or situational learning. The use of a mapping to move to an intuitively appealing and practical feature space is an advantage in all of the design, tuning, performance and computational complexity of the auditory scene analysis. The performance of the underlying scene analysis in terms of correct object identification at the time of onset or soon after significantly improves system performance by improving the collection and aggregation of data and subsequent estimation of additional parameters associated with each identified object. In addition to the simple Euclidian distance, in some embodiments other suitable distance metrics can be used, such as the great circle between two points on a similar radius or in the two dimensional hemisphere, the distance between the projection of points onto a suitable plane, or other suitable metric or norm defined in the space with desirable properties related to the clustering.

It should be noted that while Riemann sphere mapping example is used for purposes of illustration, other mappings are contemplated, as explained above. Some features of such other mappings are those in which a mapped region corresponding to variations in direction of arrival and distance (or diffusivity) is topologically equivalent to a two dimensional disc—it is closed and has a single convex boundary with no discontinuity—and equivalently a hemisphere or similar convex hull if embedded in three dimensions. The mapping is a continuous bijective mapping, meaning that two adjacent points in the original feature space are still adjacent in the mapped space, and that there is a 1:1 correspondence in both directions. Greater distance or diffusivity relates to a convergence to a central point, more direct sound relates to a point closer to the edge. Angular direction and a physical rotation of 360 degrees corresponds to a single wind or closed curve around the central point. Of general interest is a class of functions that maps an open two dimensional space (in this case one that has potentially infinite radius as objects extend in to the distance and are fully diffuse) into a closed manifold in two dimensions, which in the case of the Riemann sphere mapping is the upper half of the sphere. Generally, in a Riemann sphere mapping the radius is set to something like Power_Total/Power_Direct. This gives the range being the radius greater than unity which maps to the upper hemisphere in the Riemann mapping. For example, another similar and not quite as useful mapping is to map to the reciprocal of the radius. The idea of the sphere, however is useful as it permits the addition of a third dimension that causes variation along the radius in three dimensions through the point on the sphere mapped from the two dimensional surface being the direction and power to direct ratio.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A sound field mapping method comprising:
   generating electrical signals in response to sound in the sound field;
   applying the generated electrical signals to a spatial angle and diffusivity information extraction module operable to extract spatial angle and diffusivity information from the electrical signals; and
   applying the extracted spatial angle and diffusivity information to a mapping module;
   using the mapping module to map the spatial angle and diffusivity information for representation in the form of a Riemann sphere, wherein spatial angle varies longitudinally and diffusivity varies latitudinally along the sphere.

2. The method of claim 1, further comprising:
   using a sound level extraction module to extract sound level information from the electrical signals, said mapping module mapping the sound level information for representation in the form of the Riemann sphere, wherein the sound level maps to a monotonic variation in radius in a mapped feature space.

3. The method of claim 1, wherein the extracted spatial angle and diffusivity information correspond to the loudest object in the sound field.

4. The method of claim 1, wherein the extracted spatial angle and diffusivity information correspond to a selected region related to an object in the audio scene that is presently being tracked or estimated to be active.

5. The method of claim 1, wherein extracting spatial angle information comprises:
generating one or more covariance matrices between incoming signals or transformations of incoming signals over subsets of signal or frequency ranges; and
analyzing the generated covariance matrices to extract associated directional information of one or more sources.

6. The method of claim 5, wherein the one or more covariance matrices are filtered across time instances to obtain a smoothed estimate.

7. The method of claim 5, wherein angle of arrival is obtained from an analysis of a dominant eigenvalue of a covariance matrix.

8. The method of claim 1, further comprising:
using a sound level extraction module to extract sound level information from the electrical signals, said mapping module mapping the direction of arrival and diffusivity or distance measure to a hemisphere with a radius that varies monotonically with the sound level.

9. The method of claim 8, wherein the sound level is calculated across a range or set of frequency bands and or averaged over time.

10. The method of claim 8, wherein sound level calculation is performed during voice or desired signal activity.

11. The method of claim 1, wherein the extracted spatial angle and diffusivity information are mapped onto a feature space that maximizes uniformity of variance of spatially stationary audio objects.

12. A system for mapping a sound field based on electrical signals received in response to sound in the sound field, the system comprising:
one or more inputs each operable to receive one of the electrical signals; and
a processor coupled to the one or more inputs, the processor including:
a spatial angle extraction module operable to extract spatial angle information from one or more electrical signals received at the one or more inputs;
a diffusivity extraction module operable to extract diffusivity information from one or more electrical signals received at the one or more inputs; and
a mapping module operable to represent the spatial angle and diffusivity information in the form of a Riemann sphere, wherein spatial angle varies longitudinally and diffusivity varies latitudinally along the sphere.

13. The system of claim 12, wherein the processor further comprises:
a sound level extraction module operable to extract sound level information from one or more electrical signals received at the one or more inputs, wherein said mapping module is further operable to map the sound level information for representation in the form of the Riemann sphere, wherein sound level maps to a monotonic variation in radius in a mapped feature space.

14. The system of claim 12, wherein the spatial angle and diffusivity information object corresponds to the loudest object in the audio scene.

15. The system of claim 12, wherein the spatial angle and diffusivity information corresponds to an object in the audio scene that is being tracked.

16. The system of claim 12, wherein the spatial angle extraction module is operable to generate one or more covariance matrices between incoming signals or transformations of incoming signals over subsets of signal or frequency ranges, and to analyze the generated covariance matrices to extract associated directional information of one or more sources.

17. The system of claim 16, further comprising a filtering module operable to filter the one or more covariance matrices across time instances to obtain a smoothed estimate.

18. The system of claim 16, wherein the spatial angle extraction module is operable to obtain angle of arrival from an analysis of a dominant eigenvalue of a covariance matrix.

19. The system of claim 12, wherein the Riemann sphere representation is onto a feature space that maximizes uniformity of variance of spatially stationary audio objects.

20. A system comprising:
an array of microphones operable to generate electrical signals from a sound field; and
a processor operable to:
extract spatial angle and diffusivity information from the electrical signals; and
map the spatial angle and diffusivity information for representation in the form of a Riemann sphere, wherein spatial angle varies longitudinally and diffusivity varies latitudinally along the sphere.

21. The system of claim 20, wherein the processor is further operable to:
extract sound level information from the electrical signals, said mapping including mapping the sound level information for representation in the form of the Riemann sphere, wherein sound level maps to a monotonic variation in radius in a mapped feature space.

22. The system of claim 20, wherein the spatial angle and diffusivity information corresponds to the loudest object in the audio scene.

23. The system of claim 20, wherein the spatial angle and diffusivity information corresponds to an object in the audio scene that is being tracked.

24. The system of claim 20, wherein the Riemann sphere representation is onto a feature space that maximizes uniformity of variance of spatially stationary audio objects.

25. A non-transitory computer readable media containing instructions for mapping an audio scene based on electrical signals representing sound from the audio scene, the computer readable media when executed by a processor causing the processor to:
extract from the electrical signals spatial angle and diffusivity information; and
map the spatial angle and diffusivity information onto a representative region exhibiting variations in direction of arrival that correspond to the extracted spatial information and variations in distance that correspond to the extracted diffusivity information.

26. The non-transitory computer readable media of claim 25, said computer readable media when executed by the processor further causing the processor to extract from the electrical signals sound level information and exhibit variations in sound level along a dimension of the representative region.

* * * * *